(12) United States Patent
Kasai et al.

(10) Patent No.: US 6,397,969 B1
(45) Date of Patent: Jun. 4, 2002

(54) VEHICULAR ELECTRIC POWER STEERING DEVICE AND METHODS FOR CONTROLLING SAME

(75) Inventors: Eiji Kasai, Toyota; Shuji Fujita, Anjo, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/679,065

(22) Filed: Oct. 5, 2000

(30) Foreign Application Priority Data

Oct. 29, 1999 (JP) .......................................... 11-307930

(51) Int. Cl.[7] ................................................ B62D 5/00
(52) U.S. Cl. .......................... 180/404; 180/446; 701/39
(58) Field of Search .............................. 180/404, 443, 180/445, 446; 701/39

(56) References Cited

U.S. PATENT DOCUMENTS 4,562,896 A * 1/1986 Morishita et al. ........... 180/404
4,660,671 A * 4/1987 Behr et al. .................. 180/404
4,886,136 A * 12/1989 Kozuka et al. .............. 180/404
5,469,357 A * 11/1995 Nishimoto ................... 180/404
5,552,684 A * 9/1996 Wada et al. ................. 180/404

FOREIGN PATENT DOCUMENTS

JP          2524450          11/1996

* cited by examiner

Primary Examiner—Lanna Mai
(74) Attorney, Agent, or Firm—Oliff & Berridge, PlC

(57) ABSTRACT

An electric power steering device controls an electric motor through a program processing based on a steering torque detected by a torque sensor and a vehicle speed detected by a vehicle speed sensor, and applies a suitable assisting force to rotational motion of a steering handle. Occurrence of an abnormality in the torque sensor and a power circuit is detected through the program processing. The torque sensor is activated upon receipt of a power-supply voltage from the power circuit and detects a steering torque. If a power-supply voltage outputted from the power circuit has dropped, detection of an abnormality in the torque sensor is forbidden. If a power-supply voltage supplied from a battery to the power circuit has dropped, detection of an abnormality in the power circuit is forbidden.

20 Claims, 11 Drawing Sheets

VEHICULAR ELECTRIC POWER STEERING DEVICE AND METHODS FOR CONTROLLING SAME

The disclosure of Japanese Patent Application No. HEI 11-307930 filed on Oct. 29, 1999 including the specification, drawings and abstract is incorporated herein by reference in its entirety.

BACKGROUND OF THE INVENTION

1. Field of the Invention

The invention relates to a vehicular electric power steering device which assists steering operation of a steering handle through rotation of an electric motor and methods for controlling the same.

2. Description of the Related Art

Japanese Utility Model No. 2524450 discloses a vehicular electric power steering device which is equipped with a torque sensor device for detecting a steering torque, which controls rotation of an electric motor in accordance with a steering torque detected by the torque sensor device, and which assists steering operation of a steering handle through the rotation of the electric motor. In this electric power steering device, the torque sensor device has two sensors, i.e., a main sensor and a sub-sensor. The torque sensor device utilizes an output from the main sensor as a detected steering torque to control the electric motor. When there is a large difference between outputs from the main sensor and the sub-sensor, it is determined that there is an abnormality in the torque sensor device. Then, control of the electric motor is stopped.

However, in the aforementioned electric power steering device, if a power-supply voltage supplied from a battery to the torque sensor device through rotation of the electric motor or the like has dropped, both the torque sensor device and its marginal circuit are affected by the drop in the power-supply voltage. This is problematic in that judgment of the occurrence of an abnormality is made unnecessarily and in that the occurrence of an abnormality in the torque sensor device is misjudged. Further, if it is detected that there is a large difference in outputs from the main sensor and the sub-sensor, the occurrence of an abnormality in the torque sensor device is judged immediately. Thus, even in the case where the difference has become large temporarily due to noise or emergency, the occurrence of the abnormality is judged. In this manner, the occurrence of an abnormality may sometimes be misjudged.

SUMMARY OF THE INVENTION

The invention has been made to solve the aforementioned problems by providing an electric power steering device and methods for controlling same capable of suitably detecting an abnormality in a torque sensor device.

A vehicular electric power steering device in accordance with a first exemplary embodiment of the invention has a power circuit which is supplied with a voltage from a battery and which supplies a constant voltage to a torque sensor to activate the torque sensor, an abnormality detector which detects an abnormality in the power circuit, and an abnormality detection forbidder which forbids the abnormality detector from detecting an abnormality in the power circuit if the voltage supplied to the power circuit is equal to or smaller than a predetermined voltage.

In the electric power steering device in accordance with the first exemplary embodiment of the invention, if the voltage supplied from the battery to the power circuit has dropped, the abnormality detection forbidder forbids the abnormality detector from detecting an abnormality in the power circuit. Thus, even in the case where the voltage supplied from the battery to the power circuit has dropped to the extent of hampering suitable operation of the power circuit, there is no possibility of an abnormality in the power circuit being detected erroneously. Also, unnecessary detection of an abnormality in the power circuit is abolished, whereby it becomes possible to suitably detect the occurrence of an abnormality in the power circuit.

A vehicular power steering device in accordance with another exemplary embodiment of the invention has an abnormality detector which detects an abnormality in a torque sensor and an abnormality detection forbidder which forbids the abnormality detector from detecting an abnormality in the torque sensor.

In the vehicular electric power steering device in accordance with this exemplary embodiment of the invention, if the voltage supplied to the torque sensor has dropped, the abnormality detection forbidder forbids the abnormality detector from detecting an abnormality in the torque sensor. Thus, even in the case where the voltage supplied to the torque sensor has dropped to the extent of hampering suitable operation of the torque sensor, there is no possibility of an abnormality in the torque sensor being detected erroneously. Also, unnecessary detection of an abnormality in the torque sensor is abolished, whereby it becomes possible to suitably detect the occurrence of an abnormality in the torque sensor. Further, a vehicular power steering device in accordance with still another exemplary embodiment of the invention has an abnormality judger which detects an abnormality in a detection signal from the torque sensor and which judges that the torque sensor is abnormal if detection of the abnormality in the detection signal continues for a predetermined period or more, and a steering torque holder which holds a steering torque represented by a detection signal during normal operation of the torque sensor at least until judgment of an abnormality made by the abnormality judger if an abnormality in a detection signal from the torque sensor has been detected, and which controls the motor controller so as to control rotation of the electric motor in accordance with the held steering torque instead of the steering torque represented by the detection signal.

In the aforementioned exemplary embodiment of the invention, the abnormality judger detects an abnormality in a detection signal from the torque sensor and judges that the torque sensor is abnormal if detection of the abnormality continues for a predetermined period or more. Hence, if the abnormality in the torque sensor has been caused due to noise or emergency, the abnormality judger does not conclude the occurrence of an abnormality in the torque sensor. Further, while the abnormality judger judges the occurrence of an abnormality for a predetermined period, the detected steering torque during normal operation of the torque sensor is utilized to control the electric motor due to operation of the steering torque holder. Thus, control of the electric motor can be performed in parallel with judgment of the occurrence of an abnormality in the torque sensor. Therefore, control of the electric motor is not unnecessarily hampered, and the occurrence of an abnormality in the torque sensor is judged suitably.

Further, a vehicular power steering device in accordance with still another exemplary embodiment of the invention has a power circuit which is supplied with a voltage from a battery and which supplies a constant voltage to a torque sensor to activate the torque sensor, an abnormality judger which detects an abnormality in a detection signal from the torque sensor and which judges that the torque sensor is abnormal if detection of the abnormality in the detection signal continues for a predetermined period or more, and a steering torque holder which holds a steering torque represented by a detection signal during normal operation of the torque sensor at least until judgment of an abnormality made by the abnormality judger if an abnormality in a detection signal from the torque sensor has been detected and which controls the motor controller so as to control rotation of the electric motor in accordance with the held steering torque instead of the steering torque represented by the detection signal.

In the aforementioned exemplary embodiment of the invention, the abnormality judger detects an abnormality in a voltage supplied from the power circuit to the torque sensor, and judges that the power circuit is abnormal if detection of the abnormality continues for a predetermined period or more. Hence, if the abnormality in the power circuit has been caused due to noise or emergency, the abnormality judger does not conclude the occurrence of an abnormality in the power circuit. Further, while the abnormality judger judges the occurrence of an abnormality for a predetermined period, the detected steering torque during normal operation of the torque sensor is utilized to control the electric motor due to operation of the steering torque holder. Thus, control of the electric motor can be performed in parallel with judgment of the occurrence of an abnormality in the torque sensor. Therefore, control of the electric motor is not unnecessarily hampered, and the occurrence of an abnormality in the power circuit is judged suitably.

The aspects of the invention is not limited to a vehicular electric power steering device as described above. A further aspect of the invention is, for example, and a method for controlling the vehicular electric power steering device.

BRIEF DESCRIPTION OF THE DRAWINGS

The foregoing and further objects, features and advantages of the invention will become apparent from the following description of various exemplary embodiments with reference to the accompanying drawings, wherein.

DETAILED DESCRIPTION OF PREFERRED EMBODIMENT

Figure 1:
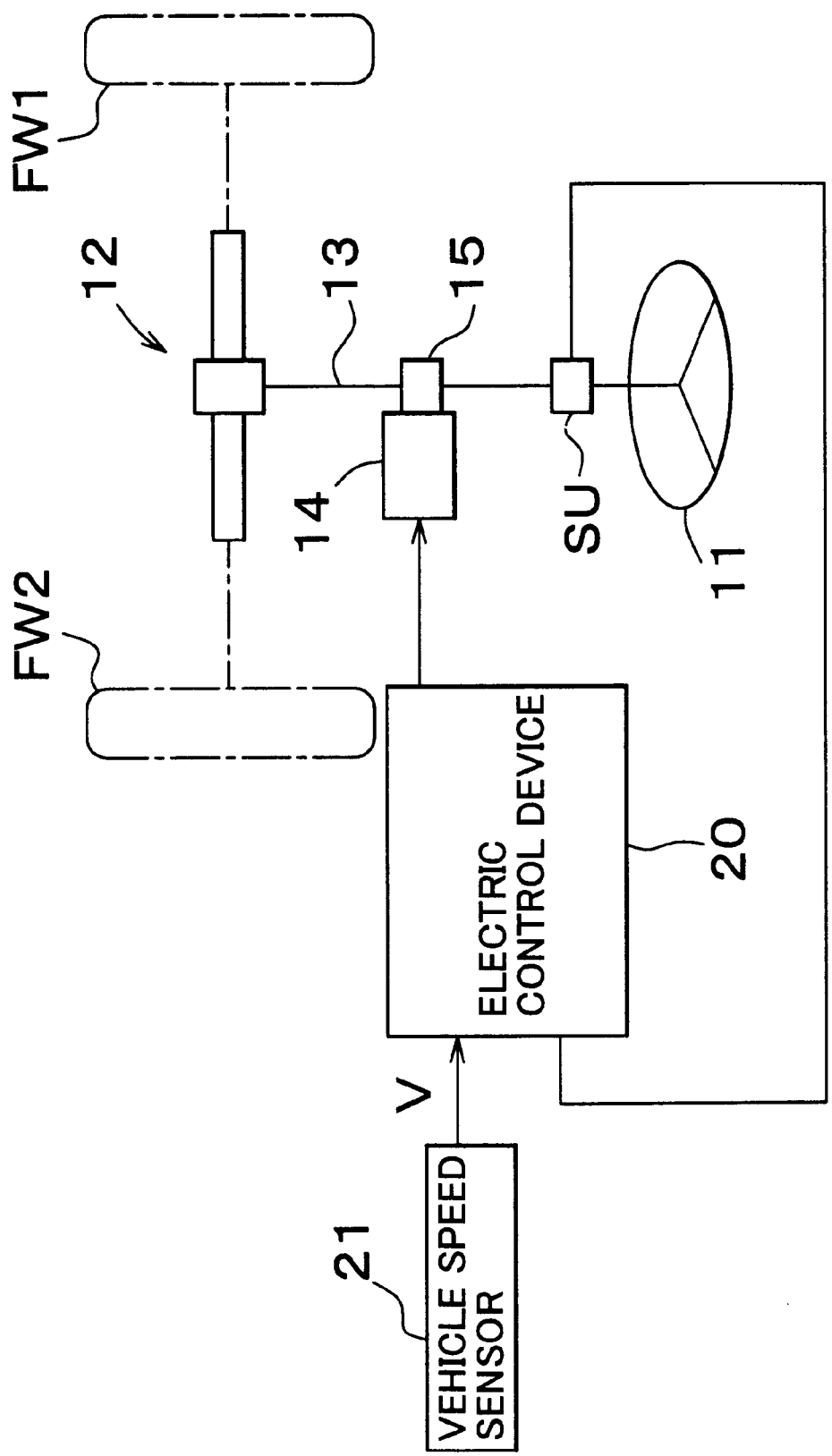
FIG. 1 is a general schematic view of an electric power steering device in accordance with one exemplary embodiment of the invention.

Hereinafter, various exemplary embodiments of the invention will be described with reference to the drawings. FIG. 1 schematically shows a vehicular electric power steering device in accordance with an exemplary embodiment of the invention.

This electric power steering device has an electric motor 14 mounted to a steering shaft 13 which transmits rotational motion of a steering handle 11 to left and right front wheels FW1, FW2 through a rack-and-pinion mechanism 12. The electric motor 14 may be, for example, a DC motor. In accordance with a rotational speed of the DC motor, the electric motor 14 applies an assisting force to rotational motion of the steering handle 11. Rotation of the electric motor 14 is transmitted to the steering shaft 13 through a deceleration mechanism 15.

An electric control device 20 is electrically connected to the electric motor 14. A vehicle speed sensor 21 and a sensor unit SU are connected to the electric control device 20. The vehicle speed sensor 21 detects a vehicle speed V and supplies a detection signal indicative of the vehicle speed V to the electric control device 20. The sensor unit SU is mounted to the steering shaft 13 and constitutes part of a later-described torque sensor device 50.

Figure 2:
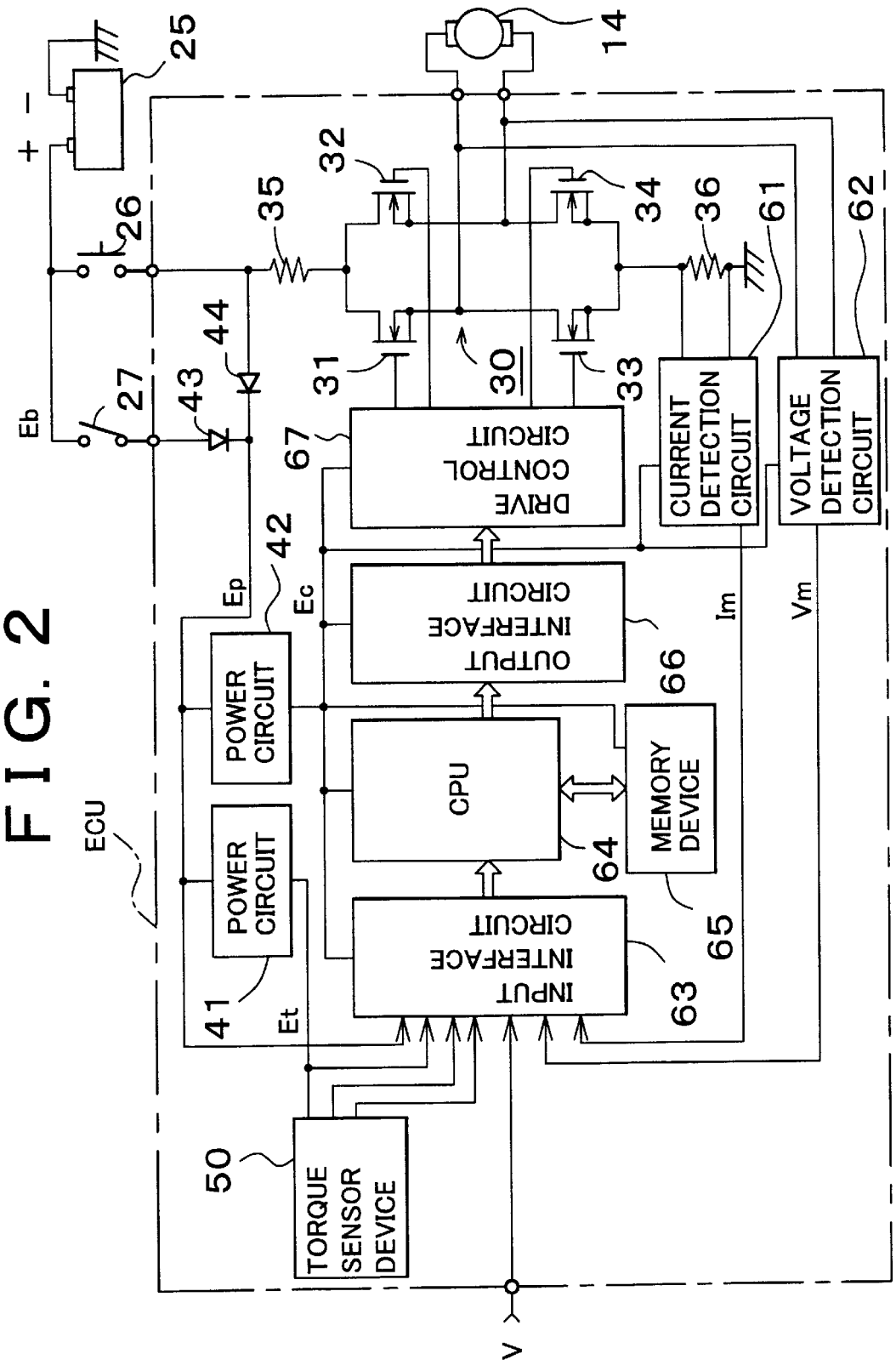
FIG. 2 is a general block diagram of an electric control device shown in FIG. 1.

As shown in FIG. 2, the electric control device 20 has an electronic control unit ECU for controlling rotation of the electric motor 14. A battery voltage Eb from a battery 25 is supplied to the ECU through a relay switch 26 and an ignition switch 27. The relay switch 26, which is normally on, is turned off upon detection of a failure by being controlled by a failure detection portion (not shown) for detecting a failure of the electric power steering device. The ignition switch 27 is turned on by a driver when starting the engine.

The ECU has a drive circuit 30 and power circuits 41, 42. The drive circuit 30, which supplies a drive circuit to the electric motor 14, is constructed as a bridge circuit having four sides with switching elements 31 through 34, such as FET's. One of a pair of opposed diagonal positions of the bridge circuit is connected to the relay switch 26 through a shunt resistor 35, and the other is grounded through a shunt resistor 36. Further, the electric motor 14 is connected at both ends to the other diagonal positions of the bridge circuit, respectively.

A power-supply voltage Ep for the ECU based on a battery voltage Eb from the ignition switch 27 and the relay switch 26 is supplied to the power circuits 41, 42 through diodes 43, 44 whose cathode sides are connected in common. The power circuit 41 outputs a power-supply voltage Et, which assumes a predetermined constant voltage (e.g. 8V) as a result of dropping the power-supply voltage Ep. The voltage Et is supplied to the torque sensor device 50. The power circuit 42 also outputs a power-supply voltage Ec, which assumes a predetermined constant voltage (e.g. 5V) as a result of dropping the power-supply voltage Ep. The voltage Ec is supplied to a current detection circuit 61, a voltage detection circuit 62, an input interface circuit 63, a CPU 64, a memory device 65, an output interface circuit 66, and a drive control circuit 67.

Figure 3:
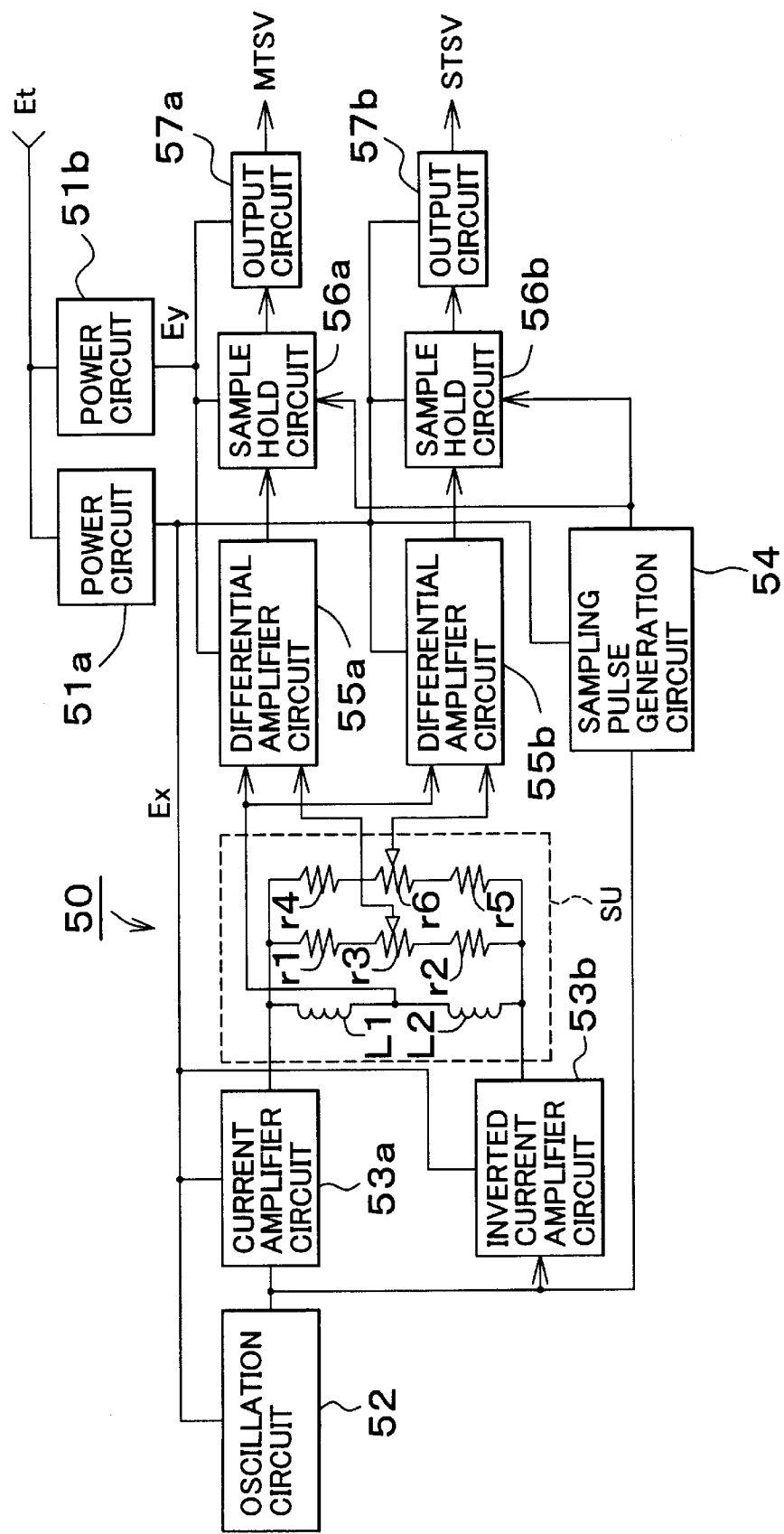
FIG. 3 is a circuit diagram of a torque sensor shown in FIG. 2.

As shown in FIG. 3, the torque sensor device 50 has power circuits 51a, 51b outputting power-supply voltages Ex, Ey, which both assume a predetermined constant voltage (e.g. 6V) as a result of dropping the power-supply voltage Et. The power-supply voltage Ex is supplied to an oscillation circuit 52, a current amplifier circuit 53a, an inverted current amplifier circuit 53b, a sampling pulse generation circuit 54, a differential amplifier circuit 55b, a sample hold circuit 56b, and an output circuit 57b. The power-supply voltage Ey is supplied to a differential amplifier circuit 55a, a sample hold circuit 56a, and an output circuit 57a.

Figure 4A:
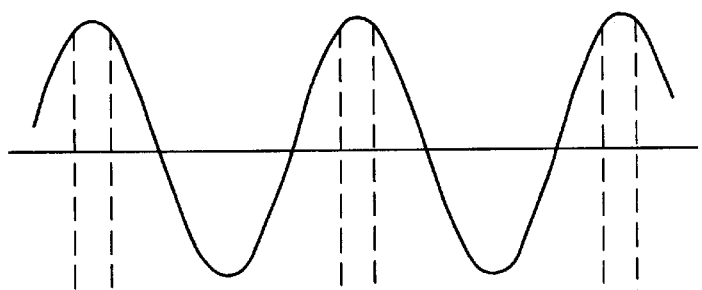
FIGS. 4A and 4B are waveform diagrams indicative of sinusoidal signals applied to a torque sensor unit SU shown in FIG. 3.
Figure 4B:
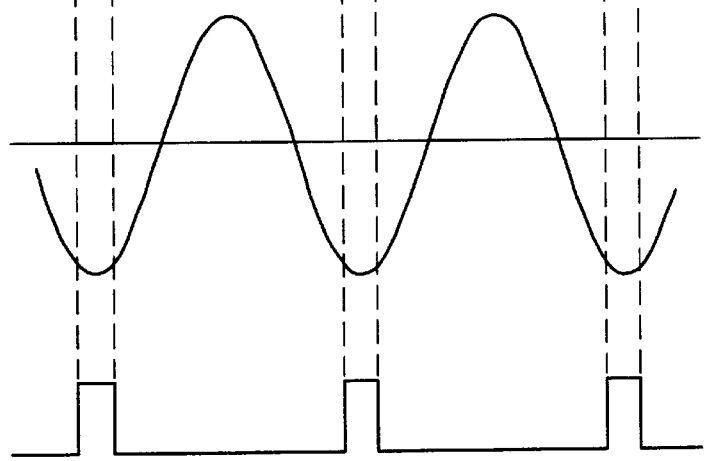
Figure 4C:
FIG. 4C is a timing chart indicative of sampling pulses.

As shown in FIG. 4A, the oscillation circuit 52 outputs a sinusoidal signal which oscillates at a predetermined frequency and a predetermined amplitude with respect to a reference voltage. The current amplifier circuit 53a outputs the sinusoidal signal through current amplification. The inverted current amplifier circuit 53b inverts the phase of the sinusoidal signal and outputs it through current amplification (see FIG. 4B). Based on a sinusoidal signal from the oscillation circuit 52, the sampling pulse generation circuit 54 outputs a rectangular pulse-train signal, which is substantially synchronized with peak positions of the sinusoidal signals as shown in FIG. 4C, to the sample hold circuits 56a, 56b as a sampling pulse.

As shown in FIG. 3, coils L1, L2 of an equal inductance are connected in series and constitute the sensor unit SU. The coil L1 is connected at one end to an output of the inverted current amplifier circuit 53a, and the coil L2 is connected at one end to an output of the current amplifier circuit 53b. The coils L1, L2 are respectively mounted to ends of an elastic oscillation member constituting part of the steering shaft 13, such as a torsion bar. The coils L1, L2 are designed such that their inductances change in opposite directions in accordance with a steering torque (a steering counterforce) acting on the steering handle 11 and the steering shaft 13. That is, a sinusoidal signal whose amplitude changes in accordance with a steering torque as well as its direction is taken out from a connection point of the coils L1, L2. The coils L1, L2 connected in series are connected in parallel at one end to a series circuit composed of resistors r1, r2 and r3 and at the other end to a series circuit composed of resistors r4, r5 and r6. Each of the resistors r3 and r6 is constructed of a potentiometer. A reference voltage is taken out from each of the resistors r3 and r6.

The differential amplifier circuit 55a receives a signal taken out from the connection point of the coils L1, L2 and a reference voltage from the resistor r3, and outputs a differential signal indicative of a difference therebetween. The differential amplifier circuit 55b receives a signal taken out from the connection point of the coils L1, L2 and a reference voltage from the resistor r6, and outputs a differential signal indicative of a difference therebetween. The sample hold circuits 56a, 56b are connected to outputs of the differential amplifier circuits 55a, 55b respectively.

Each of the sample hold circuits 56a, 56b is composed of a unidirectional semiconductor switching element which receives a voltage signal from each of the differential amplifier circuits 55a, 55b, a capacitor which is connected to an output side of the switching element to accumulate a electric charge, and a resistor which discharges the electric charge accumulated in the capacitor with a large time constant. The sample hold circuits 56a, 56b sample-hold voltage signals from the differential amplifier circuits 55a, 55b in synchronization with a sampling pulse supplied from the sampling pulse generation circuit 54 to a gate control terminal of the switching element. The sample hold circuits 56a, 56b also function as a low-pass filter based on the capacitor and the resistor.

Together with the coils L1, L2, the resistors r1, r2 and r3, the differential amplifier circuit 55a and the sample hold circuit 56a, the output circuit 57a constitutes a main sensor circuit for detecting a steering torque. The output circuit 57a amplifies a voltage signal from the sample hold circuit 56a and outputs a main torque voltage signal MTSV indicative of the steering torque. Together with the coils L1, L2, the resistors r4, r5 and r6, the differential amplifier circuit 55 and the sample hold circuit 56b, the output circuit 57b constitutes a sub-sensor circuit for detecting a steering torque. The output circuit 57b amplifies a voltage signal from the sample hold circuit 56b and outputs a sub-torque voltage signal STSV indicative of the steering torque. The main torque voltage signal MTSV and the sub-torque voltage signal STSV change with respect to a reference voltage Esr (e.g. 2.5V) between a lower limit value Es (e.g. 1.0V) and an upper limit value (e.g. 4.0V).

Referring again to FIG. 2, the current detection circuit 61 is connected to both ends of the shunt resistor 36, and outputs a detection signal indicative of a drive current Im flowing through the electric motor 14 based on a voltage between both ends of the resistor 36. The voltage detection circuit 62 is connected to both ends of the electric motor 14, and outputs a detection signal indicative of a voltage Vm between terminals of the electric motor 14. The input interface circuit 63 receives the power-supply voltage Ep supplied to the power circuit 41 for the torque sensor device 50, the power-supply voltage Et outputted from the power circuit 41, the main torque voltage signal MTSV from the torque sensor device 50, the sub-torque voltage signal STSV from the torque sensor device 50, the detection signal indicative of a vehicle speed V from the vehicle speed sensor 21, the detection signal indicative of a drive current Im from the current detection circuit 61, and the detection signal indicative of the voltage Vm between the terminals from the voltage detection circuit 62. The input interface circuit 63 may also include an A/D converter to convert the inputted analog detection signals into digital signals and supply them to the CPU 64.

The CPU 64 repeatedly executes programs shown in flowcharts shown in FIGS. 5 through 10 at intervals of a predetermined period, and controls the electric motor 14 to provide a countermeasure against various abnormalities. The memory device 65 is composed of a ROM and a RAM (including a non-volatile memory area) and stores the aforementioned programs as well as variables required to execute the programs. The output interface circuit 66 outputs a control signal corresponding to a current command value I* to a drive control circuit 67. The current command value I* is calculated through the aforementioned programs to supply a suitable current to the electric motor 14. The drive control circuit 67 performs on-off control of the switching elements 31 through 34 in the drive circuit 30 in accordance with the control signal.

Next, operation of the thus-constructed embodiment will be described. By turning the ignition switch 27 on, the power-supply voltage Ep is supplied to the respective circuits. Then, these circuits are activated. The CPU 64 starts repeatedly executing the program shown in FIG. 5 at intervals of a predetermined period. At this moment, the relay switch 26 has also been turned on. The relay switch 26 supplies the power-supply voltage Eb from the battery 25 to the drive circuit 30 and the other circuits.

Figure 5:
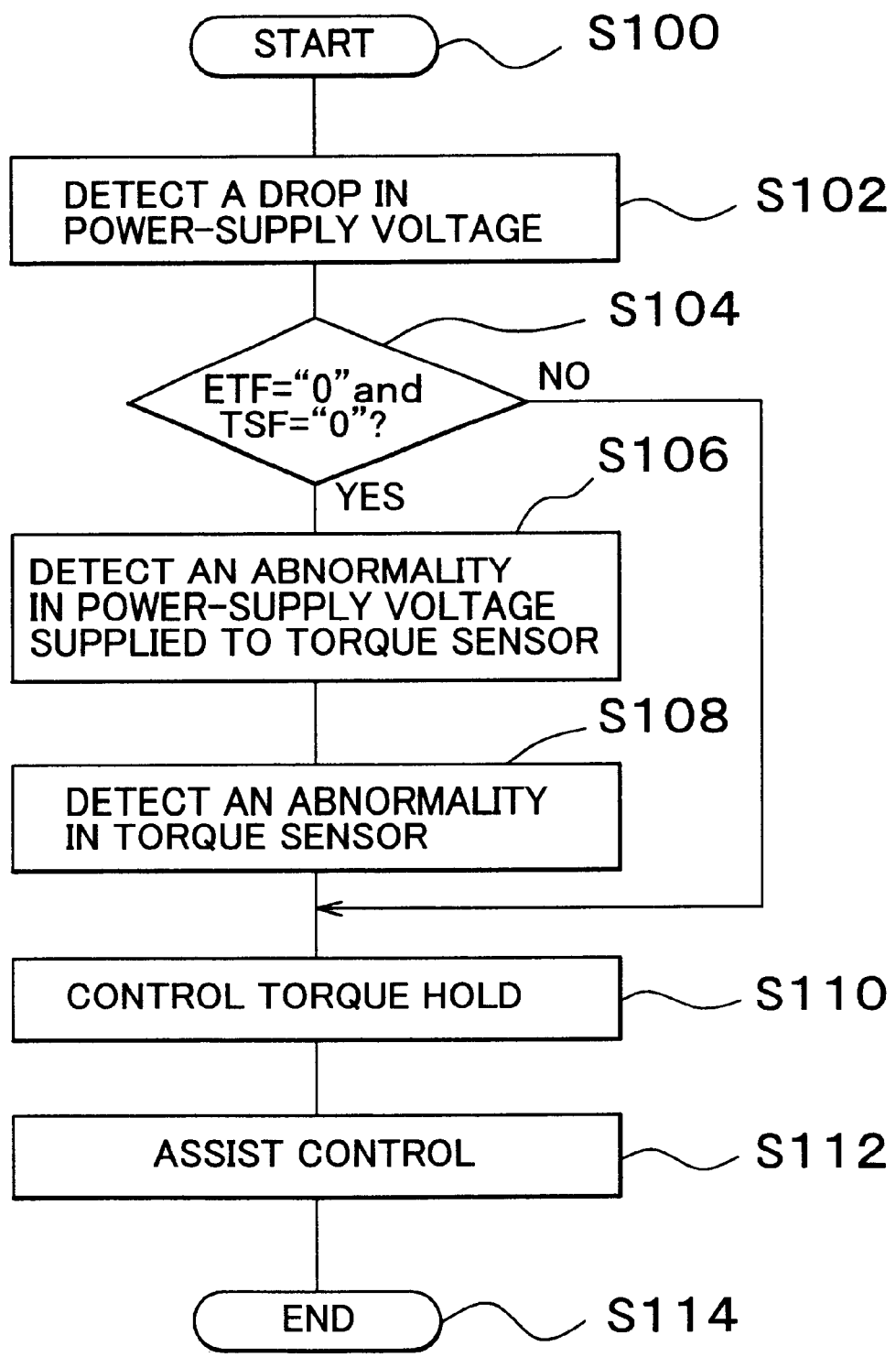
FIG. 5 is a flowchart showing a program executed by a CPU shown in FIG. 2.

The program shown in FIG. 5 is started in STEP 100. "A power-supply voltage drop detection routine" for detecting a drop in the power-supply voltage Ep is carried out in STEP 102. It is determined in STEP 104 whether or not a voltage abnormality flag ETF and a sensor abnormality flag TSF are both set to "0". If both the flags ETF, TSF are set to "0", the result in STEP 104 is positive. In this case, "a torque sensor power-supply voltage abnormality detection routine" and "a torque sensor abnormality detection routine" are carried out in STEPS 106, 108 respectively. Then, the program proceeds to STEP 110. If one of the flags ETF, TSF is set to "1", the result in STEP 104 is negative. Then, the program proceeds to STEP 110. The voltage abnormality flag ETF is set to "1" when there is an abnormality occurring in the power circuit 41 and to "0" when there is no abnormality occurring. The voltage abnormality flag ETF, which is set to "0" at the outset, is changed by "the torque sensor power-supply voltage abnormality detection routine". The sensor abnormality flag TSF is set to "1" when there is an abnormality occurring in the torque sensor device 50 and to "0" when there is no abnormality occurring. The sensor abnormality flag TSF, which is set to "0" at the outset, is changed by "the torque sensor abnormality detection routine".

If the power-supply voltage Ep has dropped, if there is an abnormality in the power-supply voltage Et, or if there is an abnormality in the main torque voltage signal MTSV from the torque sensor device 50, "a control torque hold routine" for maintaining a steering torque detected during normal operation and utilizing it as a control torque TRQ is carried out in STEP 110 so as to utilize the steering torque detected during normal operation for control of the electric motor 14. After the processing in STEP 110, rotation of the electric motor 14 is controlled in accordance with the detected steering torque in STEP 112 to assist rotational motion of the steering handle 11. Then, execution of the program is terminated in STEP 114.

Next, such an operation will be described more specifically. The description will be made as to the case where the electric power steering device is in normal operation wherein the power-supply voltage Ep has not dropped yet and wherein there is no possibility of an abnormality occurring in the power-supply voltage Et or in the torque sensor device 50.

Figure 6:
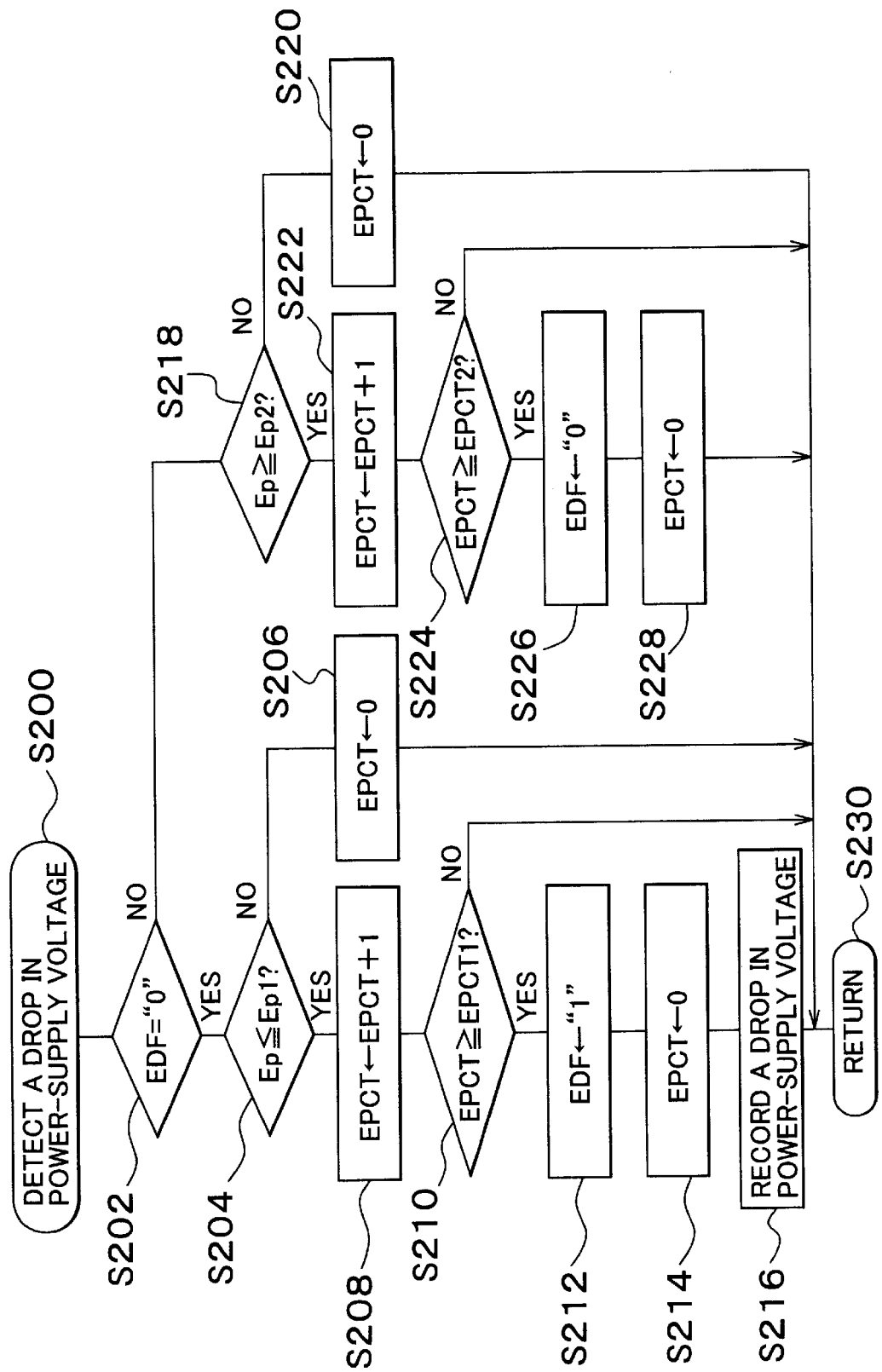
FIG. 6 is a flowchart showing the details of "a power-supply voltage drop detection routine" shown in FIG. 5.

As described above, after execution of the program has been started in STEP 100, "the power-supply voltage drop detection routine" is carried out in STEP 102. As shown in FIG. 6 in detail, execution of "the power-supply voltage drop detection routine" is started in STEP 200, and it is determined in STEP 202 whether or not a voltage drop flag EDF is set to "0". The voltage drop flag EDF is set to "1" if the power-supply voltage Ep has dropped and to "0" if the power-supply voltage Ep has been restored. Thus, in this case, the result in STEP 202 is positive when the voltage drop flag EDF is set to "0". It is determined in STEP 204 whether or not the power-supply voltage Ep is equal to or smaller than a predetermined voltage Ep1. While the power-supply voltage Ep is approximately equal to the battery voltage Eb, i.e., 12 to 13V, the predetermined voltage Ep 1 is set, for example, to 9V.

Thus, the result in STEP 204 is negative, and a count value EPCT for judging a drop in the power-supply voltage Ep is reset to "0" in STEP 206. Then, execution of this routine is terminated in STEP 230.

After the aforementioned processing in STEP 102 of FIG. 5, the result in STEP 104 is negative since the voltage abnormality flag ETF and the abnormality flag TSF are both set to "0" at the outset. Then, execution of "the control torque hold routine" is started in STEP 110. Execution of "the control torque hold routine" is started in STEP 500 of FIG. 9, and it is determined in STEP 502 whether or not the voltage abnormality flag ETF and the sensor abnormality flag TSF are both set to "0". Also in this case, since both the flags ETF, TSF are set to "0" as described above, the result in STEP 502 is positive. Then, judgment processings in STEPS 504 through 510 are performed.

It is determined in STEP 504 whether or not the power-supply voltage Ep is greater than the predetermined voltage Ep1 indicative of a voltage drop. It is determined in STEP 506 whether or not the power-supply voltage Et to be supplied to the torque sensor device 50 is between a lower limit value Et1 (e.g. 7V) and an upper limit value Et2 (e.g. 9V). These lower and upper limit values represent borders between normal and abnormal states of the power-supply voltage Et. It is determined in STEP 508 whether or not the main torque voltage signal MTSV assumes a value between a predetermined lower limit value TSV1 (e.g. 1V) and a predetermined upper limit value TSV2 (e.g. 4V). These lower and upper limit values represent borders between normal and abnormal states of the voltage signal MTSV. It is determined in STEP 510 whether or not the absolute value |MTSV−STSV| of a difference between the main torque voltage signal MTSV and the sub-torque voltage signal STSV is smaller than a predetermined small positive value ΔTSV. As described above, the electric power steering device is in normal operation, and the power-supply voltages Ep, Et, the main torque voltage signal MTSV, and the absolute value of the difference |MTSV−STSV| respectively satisfy the following relations: Ep>Ep1, Et1<Et<Et2, TSV1<MTSV<TSV2, and |MTSV−STSV|<ΔTSV. Thus, all the STEPS 504 through 510 are positive, and the program proceeds to STEPS 512, 514.

In STEP 512, a normal torque value stored in the memory device 65 is replaced by a torque value corresponding to the main torque voltage signal MTSV that has just been inputted. In STEP 514, a control torque value TRQ stored in the memory device 65 is set to the torque value corresponding to the main torque voltage signal MTSV that has just been inputted. Then, execution of "the control torque hold routine" is terminated in STEP 518.

After the aforementioned processing of FIG. 5, "an assist control routine" is carried out in STEP 112. Execution of "the assist control routine" is started in STEP 600 of FIG. 10. It is determined in STEP 602 whether or not the voltage abnormality flag ETF and the sensor abnormality flag TSF are both set to "0". Then, it is determined in STEP 604 whether or not the voltage drop flag EDF is set to "0". In this case, as described above, since all these flags ETF, STF and EDF are set to "0", the results in STEPS 602, 604 are positive. Then, the program proceeds to STEP 606.

In STEP 606, a rotational angular velocity ω of the electric motor 14 is calculated according to an equation (1) shown below, based on the drive current Im of the electric motor 14 detected by the current detection circuit 61 and the voltage Vm between terminals of the electric motor 14 detected by the voltage detection circuit 62.

$$\omega=(Vm-Rm\times Im)/K \qquad \ldots (1)$$

The aforementioned equation (1) is an approximate equation for calculating a rotational angular velocity of the DC motor without taking an inductance into account (the inductance is so small that it is usually negligible). K, Rm are constants which are determined according to the type of the motor. Because the electric motor 14 and the steering handle 11 rotate integrally, the rotational angular velocity is equal to a steering speed of the steering handle 11. Hereinafter, the rotational angular velocity will also be used as the steering speed. Next, in STEP 608, a current command value I* for the electric motor 14 is calculated to generate an assisting force corresponding to a steering state of the steering handle 11 in the electric motor 14. This current command value I* is calculated by adding compensation values to a base assist value. These compensation values include an inertia compensation value, a handle return compensation value, and a damping compensation value.

The base assist value is a basic control value for applying an assisting force to rotational motion of the steering handle 11. Referring to a conversion table which is provided for each of vehicle speed zones to convert a steering torque into a base assist value, the base assist value is calculated based on a control torque value TRQ (a steering torque indicated by the main torque voltage signal MTSV) and a vehicle speed V.

Figure 11:
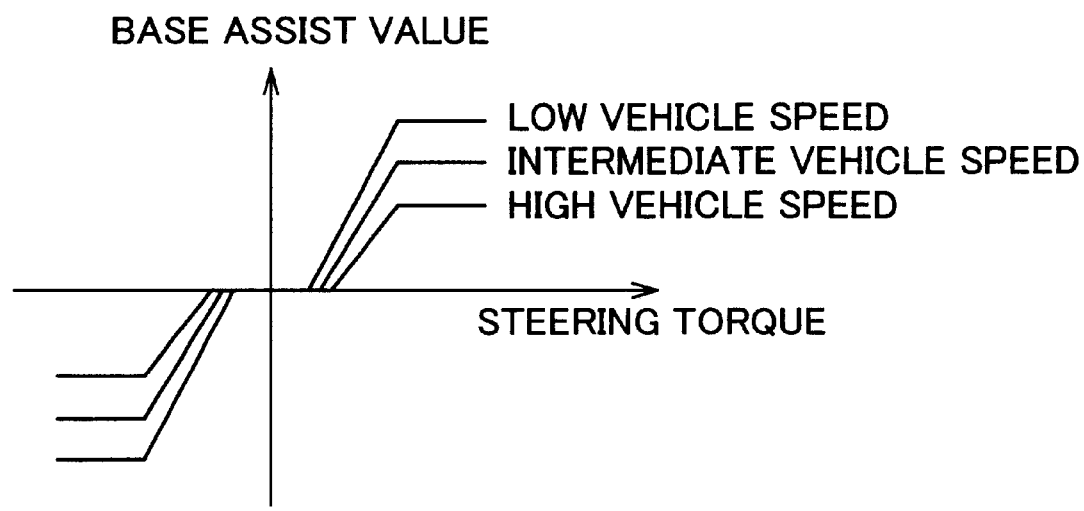
FIG. 11 is a graph showing a relation between steering torques and base assist values.

As shown in FIG. 11, the base assist value increases in accordance with an increase in steering torque and decreases in accordance with an increase in vehicle speed V.

The inertia compensation value is used to compensate for an inertia force of the electric motor 14 for rotational motion of the steering handle 11 (especially at the initial stage of rotational motion of the steering handle 11). Based on a differential value of the control torque value TRQ and the vehicle speed V, this inertia compensation value is calculated as a value which increases in accordance with an increase in the differential value and decreases in accordance with an increase in the vehicle speed V. The handle return compensation value is used to make compensation such that the steering handle 11 smoothly returns to its neutral position when steered back. Based on the steering speed and the vehicle speed V, the handle return compensation value is calculated as a value which increases in accordance with an increase in steering speed $\omega$ and decreases in accordance with an increase in vehicle speed V. The damping compensation value is used to compensate for a resistance to rotational motion of the steering handle 11. Based on the steering speed $\omega$ and the vehicle speed V, the damping compensation value is calculated as a value which acts in a direction opposite to the steering speed $\omega$, whose absolute value increases in accordance with an increase in absolute value $|\omega|$ of the steering speed $\omega$, and whose absolute value increases in accordance with an increase in vehicle speed V.

After the aforementioned processing in STEP 608, a difference between the command current value I* calculated in STEP 612 and the drive current Im is calculated. A control signal corresponding to the difference is outputted to the drive control circuit 67 through the output interface circuit 66. The drive control circuit 67 controls the switching elements 31 through 34 of the drive circuit 30 so that the drive current Im of the electric motor 14 becomes equal to the command current value I*. Thus, rotation of the electric motor 14 is transmitted to the steering shaft 13 through the deceleration mechanism 15 and rotates the steering shaft 13 with an assisting force corresponding to the command current value I*. Therefore, rotational motion of the steering handle 11 is assisted by an assisting force corresponding to a steering torque. Further, in this case, since the vehicle speed V, inertia compensation, handle return compensation and damping compensation are also taken into account, the driver can feel a good steering feeling.

Next will be described the case where the power-supply voltage Ep has not dropped yet, where there is no abnormality in the power-supply voltage Et, but where there is an abnormality occurring in the torque sensor device 50. In this case, the occurrence of an abnormality is judged in "the torque sensor abnormality detection routine" (in STEP 108 of FIG. 5). In this routine, the result in STEP 402 is positive. In other words, it is determined that the power-supply voltage Et is greater than the lower limit value Et1. Then, an abnormality judgment processing for the torque sensor device 50 composed of STEPS 404 through 438 is performed.

In this abnormality judgment processing, it is determined through the processings in STEPS 404 through 414 that there is an abnormality occurring in the torque sensor device 50, on condition that the main torque voltage signal MTSV be equal to or smaller than the lower limit value TSV1. Also, it is determined through the processings in STEPS 416 through 426 that there is an abnormality occurring in the torque sensor device 50, on condition that the main torque voltage signal MTSV be equal to or greater than the upper limit value TSV2. Further, it is determined through the processings in STEPS 428 through 438 that there is an abnormality occurring in the torque sensor device 50, on condition that the absolute value |MTSV−STSV| of the difference between the main torque voltage signal MTSV and the sub-torque voltage signal STSV be equal to or greater than the predetermined value ΔTSV.

First will be described the case where the main torque voltage signal MTSV is equal to or smaller than the lower limit value TSV1. In this case, the result in STEP 404 is positive, and a predetermined value $\alpha 1$ is added to a count value TSDCT in STEP 408. It is determined in STEP 410 whether or not the count value TSDCT is equal to or greater than a predetermined value $\gamma 1$ corresponding to a predetermined period (e.g. 30 ms). The predetermined values $\gamma 1$, $\alpha 1$ are both positive, and the predetermined value $\gamma 1$ is greater than the predetermined value $\alpha 1$.

If sufficient time has not elapsed since a drop in the main torque voltage signal MTSV and the count value TSDCT has not reached $\gamma 1$, the result in STEP 410 is negative. Then, the program proceeds to STEP 416. If the main torque voltage signal MTSV remains equal to or smaller than the lower limit value TSV1 for a predetermined period or more and the count value TSDCT has reached the predetermined value $\gamma 1$, the result in STEP 410 is positive. Then, the sensor abnormality flag TSF is set to "1" in STEP 412. In STEP 414, occurrence of an abnormality in the torque sensor device 50 as well as a time of the occurrence is written into a non-volatile memory area provided in the memory device 65. Then, a warning lamp (not shown) is lit to advise the driver of the occurrence of the abnormality.

The main torque voltage signal MTSV may be restored and become greater than the lower limit value TSV1 after having temporarily become equal to or smaller than the lower limit value TSV1. In this case, the result in STEP 404 is negative. Then, a predetermined positive value $\beta 1$ is subtracted from the count value TSDCT, and the program proceeds to STEP 416. The predetermined values $\gamma 1$, $\alpha 1$ and $\beta 1$ satisfy the following relation: $\gamma 1 > \alpha 1 > \beta 1 > 0$. In STEP 406, if the count value TSDCT has become negative due to subtraction of the predetermined value $\beta 1$, the count value TSDCT is adjusted to "0" so that it is prevented from becoming negative.

In this manner, the predetermined value $\beta 1$ is subtracted from the count value TSDCT during restoration of the main torque voltage signal MTSV, because there is often caused an abnormality by disconnection when the main torque voltage signal MTSV becomes equal to or smaller than the lower limit value TSV1. In many cases where such an abnormality has resulted from disconnection, the main torque voltage signal MTSV alternately becomes equal to or smaller than the lower limit value TSV1 and becomes restored to a normal value. Thus, the predetermined value β1 is subtracted to judge the occurrence of an abnormality in the torque sensor device 50 even in such a state.

If the main torque voltage signal MTSV has become equal to or smaller than the lower limit value TSV1 owing to a temporary phenomenon such as noise or a sudden voltage drop, the count value TSDCT decreases due to the aforementioned subtraction processing in STEP 406. Hence, there is no possibility of the torque sensor device 50 being judged to be abnormal. Accordingly, such an abnormality judgment processing makes it possible to suitably judge the occurrence of an abnormality in the torque sensor device 50 resulting from a failure such as disconnection.

Next will be described the case where the main torque voltage signal MTSV is equal to or greater than the upper limit value TSV2. In this case, the result in STEP 416 is positive. In STEP 420, a predetermined value α2 is added to a count value TSUCT. As in the aforementioned case, if the main torque voltage signal MTSV remains equal to or greater than the upper limit value TSV2 for a predetermined period (e.g. 30 ms) or more and the count value TSUCT has reached a predetermined value γ2, the sensor abnormality flag TSF is set to "1" through the processings in STEPS 422 through 426. Then, the occurrence of an abnormality in the torque sensor device 50 is recorded, and a warning is issued. Further, if the main torque voltage signal MTSV has been restored and become smaller than the upper limit value TSV2 after having temporarily become equal to or greater than the upper limit value TSV2, a predetermined value β2 is subtracted from the count value TSUCT. The predetermined values γ2, β2 and α2 satisfy the following relation: γ2>α2>β2>0. Also, the count value TSUCT is kept equal to or greater than "0". Thus, as in the processings in STEPS 404 through 414, it is possible to suitably judge the occurrence of an abnormality in the torque sensor device 50 resulting from a failure such as disconnection.

Next will be described the case where the absolute value |MTSV–STSV| of the difference between the main torque voltage signal MTSV and the sub-torque voltage signal STSV is equal to or greater than the predetermined value ΔTSV. In this case, the result in STEP 428 is positive. In STEP 432, a predetermined value α3 is added to a count value BTSCT. As in the aforementioned case, if the absolute value |MTSV–STSV| of the difference remains equal to or greater than the predetermined value ΔTSV for a predetermined period (e.g. 30 ms) or more and the counter value BTSCT has reached a predetermined value γ3 corresponding to the predetermined period, the sensor abnormality flag TSF is set to "1" through the processings in STEPS 434 through 438. Then, the occurrence of an abnormality in the torque sensor device 50 is recorded, and a warning is issued. The predetermined values γ3, α3 satisfy the following relation: γ3>α3>0.

Further, in the case of an abnormality wherein the absolute value |MTSV–STSV| of the difference between the main torque voltage signal MTSV and the sub-torque voltage signal STSV increases, there is no possibility of the absolute value |MTSV–STSV| of the difference being restored and decreasing. Thus, if the aforementioned abnormality has occurred temporarily and the absolute value |MTSV–STSV| of the difference has been restored and become smaller than the predetermined value ΔTSV, the result in STEP 428 is negative. Then, the count value BTSCT is reset to "0" in STEP 430.

Figure 9:
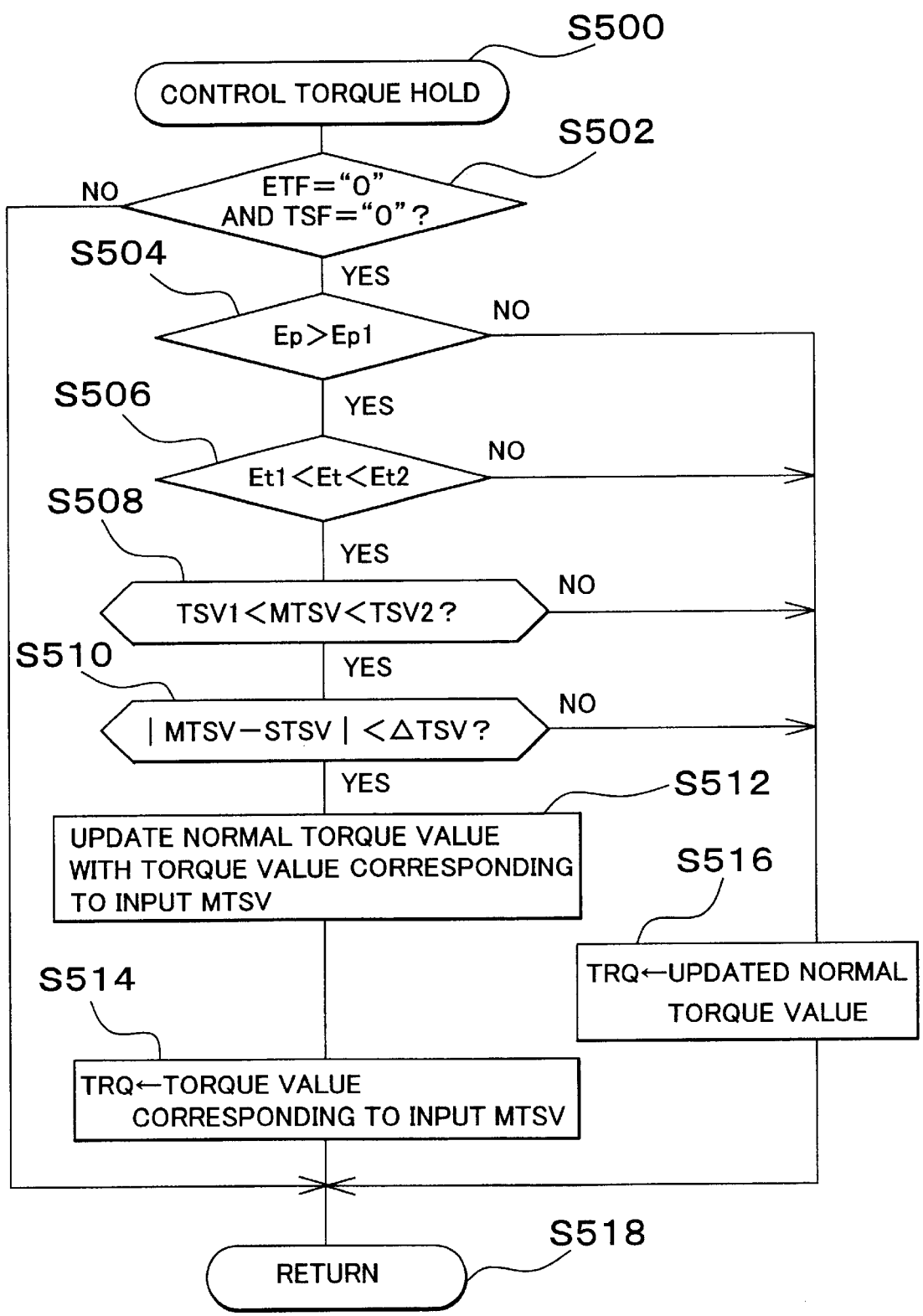
FIG. 9 is a flowchart showing the details of "a control torque hold routine" shown in FIG. 5.

During such a process of judging the occurrence of an abnormality in the torque sensor device 50, the main torque voltage signal MTSV is either equal to or smaller than the lower limit value TSV1 or equal to or greater than the upper limit value TSV2, or the absolute value |MTSV–STSV| of the difference between the main torque voltage signal MTSV and the sub-torque voltage signal STSV is equal to or greater than the predetermined value ΔTSV. Accordingly, the result in STEP 508 or STEP 510 in "the control torque hold routine" (STEP 110 of FIG. 5) shown in FIG. 9 is negative. In STEP 516, the control torque value TRQ is set to a normal torque value which has been updated through the processing in STEP 512, i.e., to a detected steering torque which is represented by the main torque voltage signal MTSV prior to the occurrence of an abnormality in the voltage signal MTSV.

Figure 10:
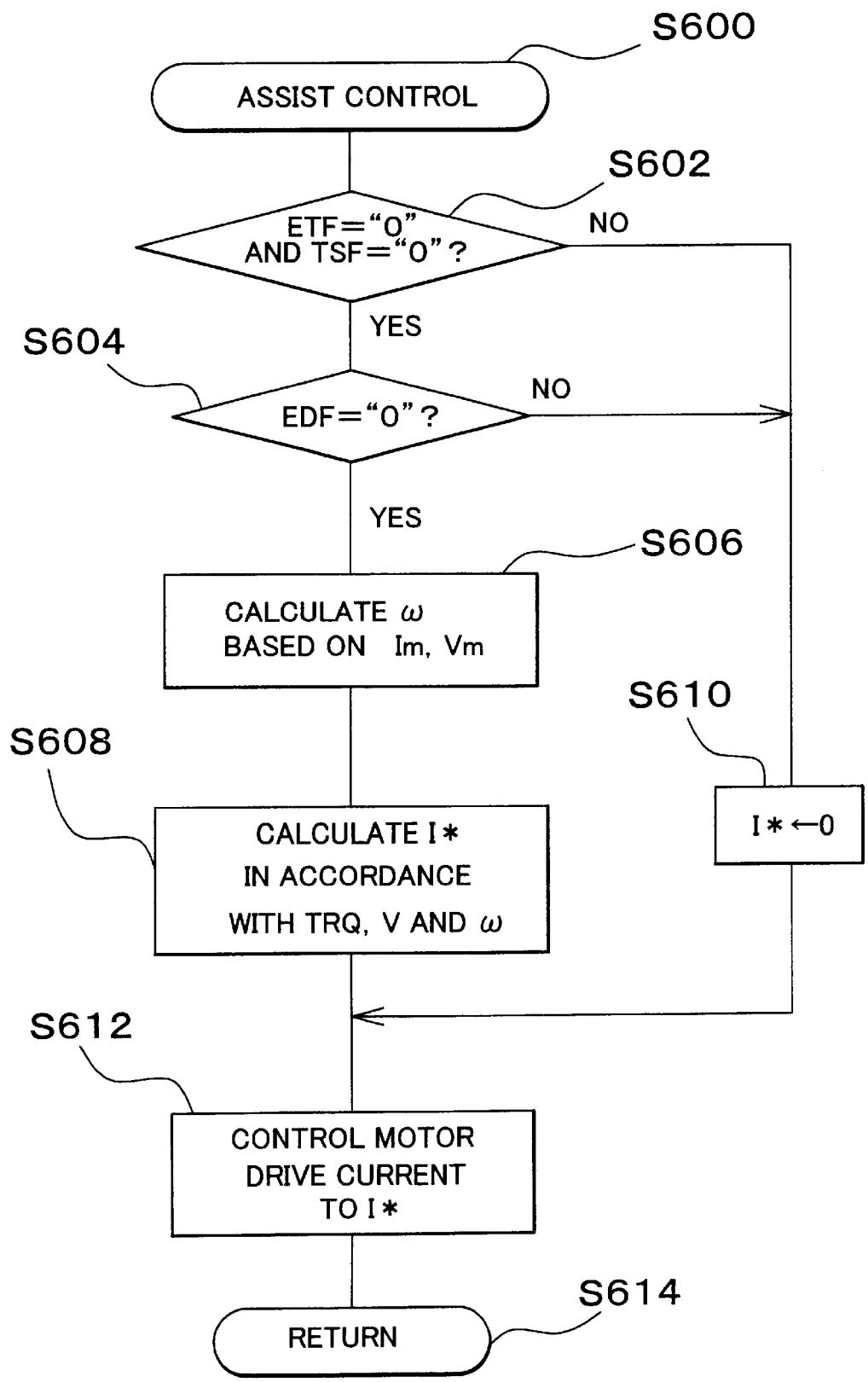
FIG. 10 is a flowchart showing the details of "an assist control routine" shown in FIG. 5.

In calculating the command current value I* through the processing in STEP 608 in "the assist control routine" (STEP 112 of FIG. 5) shown in FIG. 10, the thus-set control torque value TRQ is utilized. In controlling rotation of the electric motor 14, the detected steering torque represented by the main torque voltage signal MTSV prior to the occurrence of an abnormality in the voltage signal MTSV is utilized.

After a duration of an abnormal state of the main torque voltage signal MTSV, if the occurrence of an abnormality in the torque sensor device 50 is judged and the sensor abnormality flag TSF is set to "1", the result in STEP 502 of "the control torque hold routine" (STEP 110 of FIG. 5) shown in FIG. 9 is negative. Then, execution of this routine is terminated. Further, the result in STEP 602 of "the assist control routine" (STEP 112 of FIG. 5) shown in FIG. 10 is also negative. Then, the command current value I* is set to "0" through the processing in STEP 610. As a result, even during drive control of the electric motor 14 in STEP 612, the drive current Im of the motor 14 is controlled to "0". Thus, assist control for rotational motion of the steering handle 11 is also stopped. In this case, the result in STEP 104 is also negative. Thus, execution of "the torque sensor power-supply voltage abnormality detection routine" in STEP 106 and "the torque sensor abnormality detection routine" in STEP 108 is terminated.

In this manner, only if the main torque voltage signal MTSV remains abnormal for a predetermined period or more, the occurrence of an abnormality in the torque sensor device 50 is judged. Therefore, if there is a temporary abnormality occurring in the torque sensor device 50 due to noise or emergency, the occurrence of an abnormality in the torque sensor device 50 is not concluded. Hence, the occurrence of an abnormality can be judged suitably. In this case, prior to detection of an abnormality in the main torque voltage signal MTSV, a normal steering torque value is sequentially updated through the processings in STEPS 508 through 512 of "the control torque hold routine". Upon detection of an abnormality in the voltage signal MTSV, the normal steering torque value is maintained through the processings in STEPS 508, 510 and 516 and utilized as the control torque value TRQ. Thus, control of the electric motor 14 can be performed in parallel with judgment of the occurrence of an abnormality in the torque sensor device. Therefore, control of the electric motor 14 is not unnecessarily hampered, and the occurrence of an abnormality in the torque sensor device 50 is judged suitably.

Next will be described the case where the power-supply voltage Ep has not dropped and where there is an abnormality occurring in the power circuit 41 for the torque sensor device 50. In this case, the occurrence of the aforementioned abnormality is judged in "the torque sensor power-supply voltage abnormality detection routine" (STEP 106 of FIG. 5) shown in FIG. 7. In this routine, the result in STEP 302 is positive. In other words, it is determined that the power-supply voltage Ep is greater than the predetermined voltage Ep1. Then, the processing of judging the occurrence of an abnormality in the power circuit 41 composed of STEPS 304 through 326 is performed.

In this abnormality judgment processing, it is determined through the processings in STEPS 304 through 314 that there is an abnormality occurring in the power circuit 41, on condition that the power-supply voltage Et be equal to or smaller than the lower limit value Et1. Also, it is determined through the processings in STEPS 316 through 326 that there is an abnormality occurring in the power-supply circuit 41, on condition that the power-supply voltage Et be equal to or greater than the upper limit value Et2.

First will be described the case where the power-supply voltage Et is equal to or smaller than the lower limit value Et1. In this case, the result in STEP 304 is positive. Then, "1" is added to a count value ETDCT in STEP 308. Then, it is determined in STEP 310 whether or not the count value ETDCT is equal to or greater than a predetermined value ETDCT1 corresponding to a predetermined period (e.g. 30 ms). If no long time has elapsed since a drop in the power-supply voltage Et and the count value ETDCT has not reached the predetermined value ETDCT1, the result in STEP 310 is negative. Then, the program proceeds to STEP 316.

If the power-supply voltage Et remains equal to or smaller than the lower limit value ETDCT1 for the predetermined period or more and the count value ETDCT has reached the predetermined ETDCT1, the result in STEP 310 is positive. In STEP 312, the voltage abnormality flag ETF is set to "1". Then, in STEP 314, occurrence of an abnormal voltage in the power circuit 41 as well as a time of the occurrence is written into a non-volatile memory area provided in the memory device 65. Then, a warning lamp (not shown) is lit to advise the driver of the occurrence of the abnormality.

Further, the power-supply voltage Et may be restored and become greater than the lower limit value Et1 after having temporarily become equal to or smaller than the lower limit value Et1. In this case, the result in STEP 304 is negative. In STEP 306, the count value TDCT is reset to "0". Then, the program proceeds to STEP 316. Because the processing in STEP 306 is also performed prior to a drop in the power-supply voltage Et, the count value ETDCT is kept equal to "0" prior to the drop in the power-supply voltage Et.

Next will be described the case where the power-supply voltage Et is equal to or greater than the upper limit value Et2. In this case, the result in STEP 316 is positive. In STEP 320, "1" is added to the count value ETUCT. As described above, if the power-supply voltage Et remains equal to or greater than the upper limit value Et2 for a predetermined period (e.g. 30 ms) or more and the count value ETUCT has reached the predetermined value ETUCT2, the voltage abnormality flag ETF is set to "1" through the processings in STEPS 322 through 326. Then, the occurrence of an abnormality in the power circuit 41 is recorded, and a warning is issued. Also in this case, if the power-supply voltage Et is restored and becomes smaller than the upper limit value Et2 after having temporarily become equal to or smaller than the upper limit value Et2, or if the power-supply voltage Et is kept smaller than the upper limit value Et2, the count value ETUCT is reset to "0" through the processing in STEP 318.

During such a process of judging the occurrence of an abnormality in the power circuit 41, the power-supply voltage Et is either equal to or smaller than the lower limit value Et1 or equal to or greater than the upper limit value Et2. Accordingly, the result in STEP 506 in "the control torque hold routine" (STEP 110 of FIG. 5) shown in FIG. 9 is negative. As in the aforementioned case, in STEP 516, the control torque value TRQ is set to a normal torque value which has been updated and stored through the aforementioned processing in STEP 512. Then, the thus-set control torque value TRQ is utilized to calculate a command current value I* through the processing in STEP 608 in "the assist control routine" (STEP 112 of FIG. 5) shown in FIG. 10. Therefore, the detected steering torque represented by the voltage signal MTSV prior to generation of an abnormality in the main torque voltage signal MTSV is utilized to control rotation of the electric motor 14.

After a duration of an abnormal state of the main torque voltage signal MTSV, if the occurrence of an abnormality in the power circuit 41 is judged and the voltage abnormality flag ETF is set to "1", the result in STEP 502 of "the control torque hold routine" (STEP 110 of FIG. 5) shown in FIG. 9 is negative. Then, execution of this routine is terminated. Further, the result in STEP 602 of "the assist control routine" (STEP 112 of FIG. 5) shown in FIG. 10 is also negative. Then, the command current value I* is set to "0" through the processing in STEP 610. As a result, even during drive control of the electric motor 14 in STEP 612, the drive current Im of the motor 14 is controlled to "0". Thus, assist control for rotational motion of the steering handle 11 is also stopped. In this case, the result in STEP 104 of FIG. 5 is also negative. Thus, execution of "the torque sensor power-supply voltage abnormality detection routine" in STEP 106 and "the torque sensor abnormality detection routine" in STEP 108 is also terminated.

In this manner, only if the power-supply voltage Et remains abnormal for a predetermined period or more, the occurrence of an abnormality in the power circuit 41 is judged. Therefore, if there is a temporary abnormality occurring in the power circuit 41 due to noise or emergency, the occurrence of an abnormality in the power circuit 41 is not concluded. Hence, the occurrence of an abnormality can be judged suitably. In this case, prior to detection of an abnormality in the power-supply voltage Et, a normal steering torque value is sequentially updated through the processings in STEPS 506 through 512 of "the control torque hold routine". Upon detection of an abnormality in the voltage Et, the normal steering torque value is maintained through the processings in STEPS 506, 516 and utilized as the control torque value TRQ. Thus, control of the electric motor 14 can be performed in parallel with judgment of the occurrence of an abnormality in the torque sensor device 50. Therefore, control of the electric motor 14 is not unnecessarily hampered, and the occurrence of an abnormality in the torque sensor device 50 is judged suitably.

Figure 7:
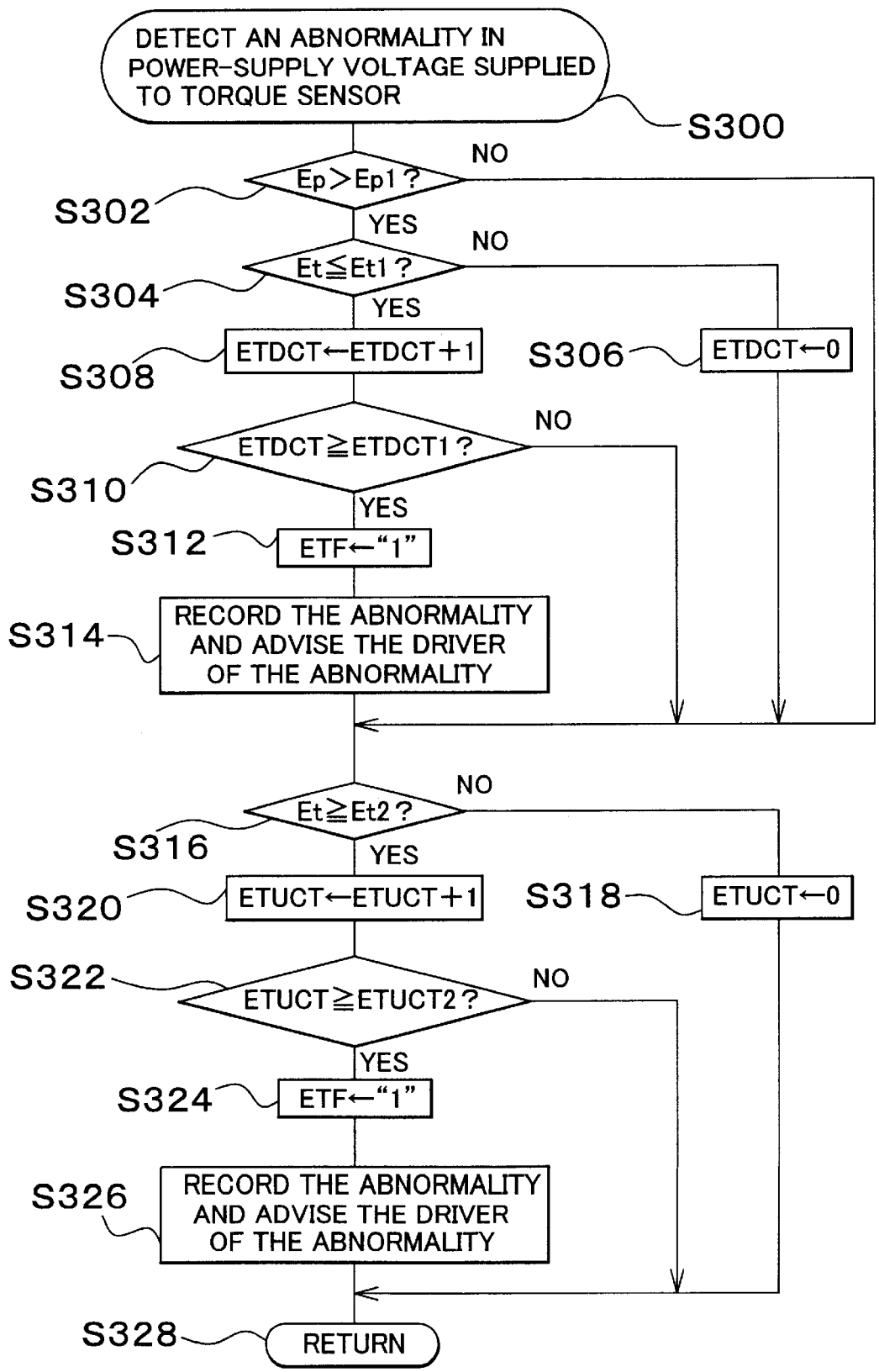
FIG. 7 is a flowchart showing the details of "a torque sensor power-supply voltage abnormality detection routine" shown in FIG. 5.
Figure 8:
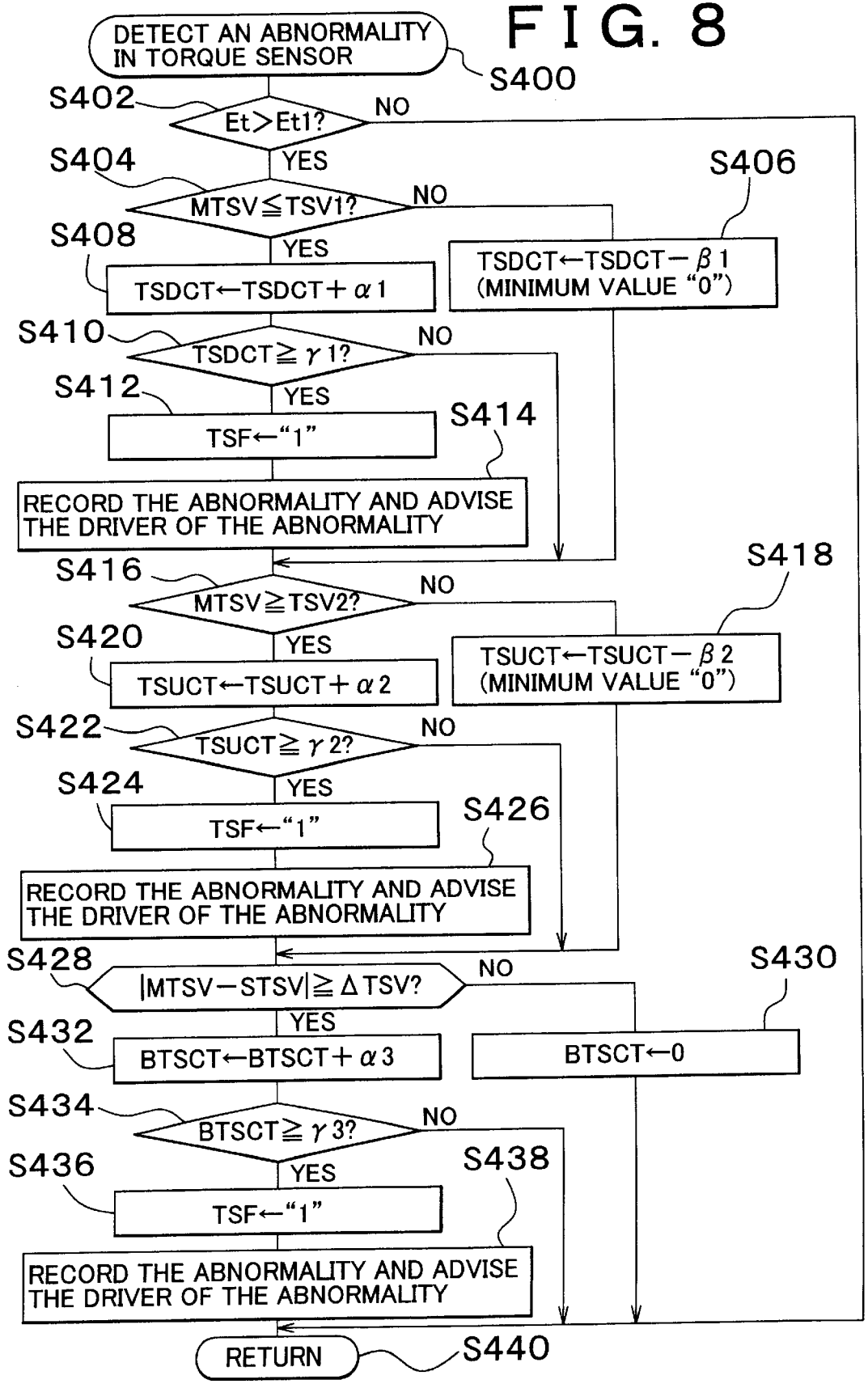
FIG. 8 is a flowchart showing the details of "a torque sensor abnormality detection routine" shown in FIG. 5.

Further, as described above, if the power-supply voltage Et supplied from the power circuit 41 to the torque sensor device 50 has become equal to smaller than the lower limit value Et1, the result in STEP 402 of "the torque sensor abnormality detection routine" (STEP 108 of FIG. 5) shown in FIG. 8 is negative. Then, execution of the routine is terminated in STEP 440 without performing the processing of judging the occurrence of an abnormality in the torque sensor device 50 composed of STEPS 404 through 438. In other words, if the power-supply voltage Et has become equal to or smaller than the lower limit value Et1, judgment of the occurrence of an abnormality in the torque sensor device 50 is forbidden. That is, if an abnormality has occurred in the power circuit 41 and the power-supply voltage Et supplied to the torque sensor device 50 has become equal to or smaller than the lower limit value Et1, it is quite likely that the main torque voltage signal MTSV from the torque sensor device 50 will also become abnormal. Further, the occurrence of an abnormality in the power circuit 41 is detected by "the torque sensor power-supply voltage abnormality routine" shown in FIG. 7. Thus, the occurrence of an abnormality in the torque sensor device 50 is not misjudged. Also, unnecessary detection of an abnormality in the torque sensor device 50 is prevented, whereby it becomes possible to suitably detect the occurrence of an abnormality in the torque sensor device 50.

Next will be described the case where the power-supply voltage Ep supplied to the power circuits 41, 42 through operation of the electric motor 14 or the like has dropped from a normal voltage and become equal to or smaller than the predetermined voltage Ep1 which destabilizes operations of the respective circuits, especially the power circuit 41 and the torque sensor device 50. In this case, the result in STEP 204 in "the power-supply voltage drop detection routine" (STEP 102 of FIG. 5) shown in FIG. 6 is positive. In STEP 208, "1" is added to the count value EPCT. It is determined in STEP 210 whether or not the count value EPCT is equal to or greater than a predetermined value EPCT1 corresponding to a predetermined period (e.g. 20 ms). If sufficient time has not elapsed since a drop in the power-supply voltage Ep and the count value EPCT has not reached the predetermined value EPCT1, the result in STEP 210 is negative. Then, execution of this routine is terminated in STEP 230.

If the power-supply voltage Ep remains equal to or smaller than the predetermined voltage Ep1 for the predetermined period or more and the count value EPCT has reached the predetermined value EPCT1, the result in STEP 210 is positive. Then, the power-supply voltage drop flag EDF is set to "1". In STEP 214, the count value EPCT is reset to "0". In STEP 216, a drop in the power-supply voltage Ep as well as a time of the voltage drop is written into the non-volatile memory area provided in the memory device 65.

During such a process of judging a drop in the power-supply voltage Ep, if the voltage Ep has become smaller than the predetermined voltage Ep1, the result in STEP 302 of "the torque sensor power-supply voltage abnormality detection routine" (STEP 106 of FIG. 5) shown in FIG. 7 is negative. Then, the program proceeds to STEP 316 and the subsequent STEPS. Thus, the processing of detecting the occurrence of an abnormal drop in the power-supply voltage Et for the torque sensor device 50 composed of STEPS 304 through 314 is not performed. As a result, the power-supply voltage Ep supplied to the power circuit 41 for the torque sensor device 50 drops. If suitable operation of the power circuit 41 for the torque sensor device 50 is not ensured, there is no possibility of occurrence of an abnormality in the power circuit 41 being detected erroneously. Also, unnecessary detection of an abnormality in the power circuit 41 is prevented, whereby it becomes possible to suitably detect the occurrence of an abnormality in the power circuit 41.

Further, if the power-supply voltage Ep becomes smaller than the predetermined voltage Ep1, the result in STEP 504 in "the control torque hold routine" (STEP 110 of FIG. 5) shown in FIG. 9 is also negative. As described above, in STEP 516, the control torque value TRQ is set to a normal torque value which has been updated and stored through the processing in STEP 512. The thus-set control torque value TRQ is utilized to calculate a command current value I* through the processing in STEP 608 of "the assist control routine" (STEP 112 of FIG. 5) shown in FIG. 10. Therefore, the detected steering torque represented by the main torque voltage signal MTSV prior to occurrence of an abnormality in the voltage signal MTSV is utilized to control rotation of the electric motor 14.

Further, as described above, if the power-supply voltage drop flag EDF is set to "1", the result in STEP 604 of "the assist control routine" (STEP 112 of FIG. 5) shown in FIG. 10 is negative. Then, the command current value I* is set to "0" through the processing in STEP 610. Thus, control of rotation of the electric motor 14 is stopped, and the motor 14 applies no assisting force for rotational motion of the steering handle 11. As a result, the electric motor 14 does not consume electric power. This makes it possible to prevent the other systems from being adversely affected by a deficiency of electric power.

In "the power-supply voltage drop detection routine" shown in FIG. 6, after the power-supply voltage drop flag EDF has been set to "1", the result in STEP 202 is negative. Then, the program proceeds to STEP 218 and the subsequent STEPS. It is determined in STEP 218 whether or not the power-supply voltage Ep is equal to or greater than a predetermined voltage Ep2. The predetermined voltage Ep2 is greater than the predetermined voltage Ep1 and is set, for example, to 12V. If the power-supply voltage Ep has not been restored and remains smaller than the predetermined voltage Ep2, the result in STEP 218 is negative. Then, the count value EPCT in STEP 220 is reset to "0", and execution of this routine is terminated in STEP 230.

Further, if the power-supply voltage Ep has been restored and becomes equal to or greater than the predetermined voltage Ep2, the result in STEP 218 is positive. In STEP 222, "1" is added to the count value EPCT. Then, if the power-supply voltage Ep remains equal to or greater than the predetermined voltage Ep2 for a predetermined period (e.g. 20 ms) or more and the count value EPCT has reached a predetermined value EPCT2 corresponding to the predetermined value, the result in STEP 224 is positive. Then, the power-supply voltage drop flag EDF is reset to "0" in STEP 226, and the count value EPCT is reset to "0" in STEP 228.

During such a process of judging restoration of the power-supply voltage Ep, if the voltage Ep becomes equal to or greater than the predetermined voltage Ep1, the result in STEP 302 of "the torque sensor power-supply voltage abnormality detection routine" (STEP 106 of FIG. 5) shown in FIG. 7 is also positive. The processing of judging the occurrence of an abnormality in the power circuit 41 relating to a drop in the power-supply voltage Et supplied to the torque sensor device 50 is executed again. This processing is composed of STEPS 304 through 314. Further, the result in STEP 504 of "the control torque hold routine" (STEP 110 of FIG. 5) shown in FIG. 9 is also positive. Then, the processings in STEP 506 and the subsequent STEPS are performed. Furthermore, if the power-supply voltage drop flag EDF is restored to "0", the result in STEP 604 of "the assist control routine" (STEP 112 of FIG. 5) shown in FIG. 10 is also positive. Then, assist control in accordance with the detected steering torque in STEPS 606 through 612 is also restored.

Figure 12:
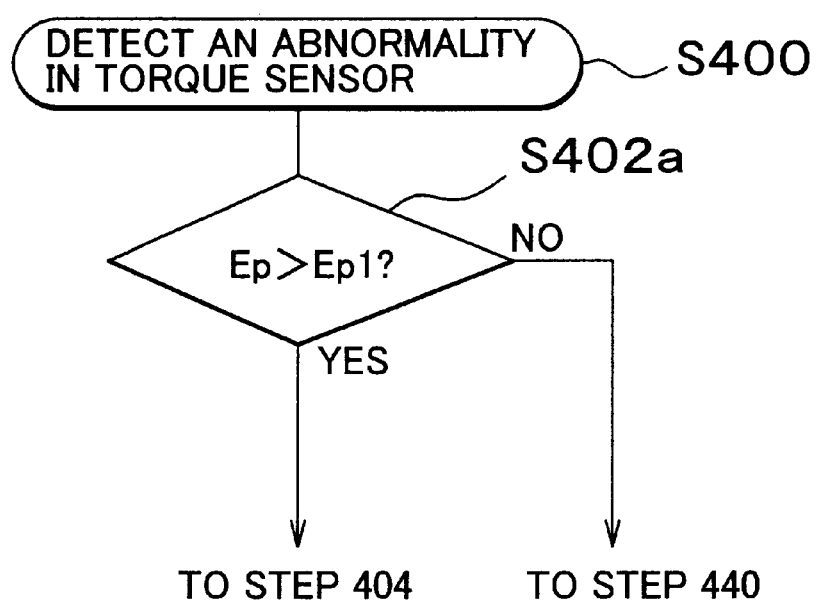
FIG. 12 is a flowchart showing part of a modification example of "a torque sensor abnormality detection routine" shown in FIG. 8.

As described above, in "the torque sensor abnormality detection routine" shown in FIG. 8, the processing of judging the occurrence of an abnormality in the torque sensor device 50 composed of STEPS 404 through 438 is performed only when the power-supply voltage Et supplied from the power circuit 41 to the torque sensor device 50 is greater than the lower limit value Et1. However, the power-supply voltage Et supplied to the torque sensor device 50 drops mainly due to a drop in the power-supply voltage Ep supplied to the power circuit 41. Further, the occurrence of an abnormality in the power circuit 41 is judged through execution of "the torque sensor power-supply voltage abnormality detection routine" shown in FIG. 7. Thus, as shown in FIG. 12, the processing of judgment in STEP 402 of "the torque sensor abnormality detection routine" shown in FIG. 8 may be replaced by a processing of judgment in STEP 402a for determining whether or not the power-supply voltage Ep is greater than the predetermined voltage Ep1. That is, if the power-supply voltage Ep is greater than the predetermined voltage Ep1, the result in STEP 402a is positive. Then, the processing of judging the occurrence of an abnormality in the torque sensor device 50 composed of STEPS 404 through 438 is performed. If the power-supply voltage Ep is equal to or smaller than the predetermined voltage Ep 1, the result in STEP 402a is negative. Then, execution of this routine is terminated in STEP 440 without performing the processing of judging the occurrence of an abnormality in the torque sensor device 50.

This also makes it possible to eliminate misjudgment of the occurrence of an abnormality in the torque sensor device 50 in the case where the power-supply voltage Ep is equal to or smaller than the predetermined voltage Ep 1 and where suitable operation of the torque sensor device 50 cannot be ensured. Unnecessary detection of an abnormality in the torque sensor device 50 is also prevented, whereby it becomes possible to suitably detect the occurrence of an abnormality in the torque sensor device 50. The processing of judgment in STEP 402 and the processing of judgment in STEP 402a may be performed simultaneously.

Further, as described above, a voltage on the cathode side of the diodes 43, 44 is adopted as the power-supply voltage Ep supplied to the power circuits 41, 42. However, it is also possible to adopt a voltage on the anode side of the diodes 43, 44 or a voltage Eb of the battery 25.

Further, in "the control torque hold routine" shown in FIG. 9, if the power-supply voltages Ep, Et, the main torque voltage signal MTSV and the absolute value of the difference |MTSV–STSV| satisfy the following relations through the processings in STEPS 504 through 510, i.e., Ep>Ep1>Et1<Et<Et2, TSV1<MTSV<TSV2, and |MTSV–STSV|<ΔTSV respectively, the steering torque represented by the main torque voltage signal MTSV that has just been inputted in STEP 512 is always updated and set as a normal torque value. However, in the processing of STEP 512, the steering torque value represented by the main torque voltage signal MTSV that has just been inputted or the average of a plurality of steering torque values represented by the main torque voltage signals MTSV that had been inputted by the time which is a plurality of times prior to the present time may be updated and set as a normal torque value only if a change in the steering torque represented by the main torque voltage signals MTSV that have sequentially been inputted remains small for a predetermined period or more. This makes it possible to prevent the normal torque value from being updated erroneously, for example, when the power-supply voltage Ep, the power-supply voltage Et, the main torque voltage signal MTSV or the absolute value of the difference |MTSV–STSV| happens to assume a value satisfying the aforementioned relations instantaneously, despite an abnormal state of the power circuit 41, the torque sensor device 50 or the like after one of the aforementioned respective values has temporarily become equal to an abnormal value.

Further, the average of steering torque values represented by the main torque voltage signals MTSV that had been inputted by the time which is a predetermined period prior to the time when the power-supply voltage Ep, the power-supply voltage Et, the main torque voltage signal MTSV and the absolute value of the difference |MTSV–STSV| fail to satisfy the aforementioned relations for the first time may be updated and set as a normal torque value.

It will be appreciated by those skilled in the art that the electronic control device can be implemented using a single special purpose integrated circuit (e.g., ASIC) having a main or central processor section for overall, system-level control, and separated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs, or the like). The controller can be implemented using a suitably programmed general purpose computer, e.g., a microprocessor, microprocessor or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 5–10 and 12 and described herein can be used as the controller. A distributed processing architecture can be used for maximum data/signal processing capability and speed.

While the invention has been described with reference to various exemplary embodiments thereof, it is to be understood that the invention is not limited to the disclosed embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are within the spirit and scope of the invention.

What is claimed is:

1. A vehicular electric power steering device comprising:
    an electric motor that applies an assisting force to a steering torque in accordance with rotational motion of a steering handle;
    a torque sensor that detects the steering torque;
    a motor controller that controls rotation of the electric motor in accordance with the detected steering torque;
    a battery that supplies a voltage;
    a power circuit that is supplied with the voltage from the battery and that supplies a constant voltage to the torque sensor to activate the torque sensor;
    an abnormality detector that detects an abnormality in the power circuit; and
    an abnormality detection forbidder that forbids detection of an abnormality in the power circuit by the abnormality detector when the voltage supplied to the power circuit is equal to or smaller than a predetermined voltage.

2. The vehicular electric power steering device according to claim 1, wherein:
    the abnormality detector judges that the power circuit is abnormal, if one of the following conditions is satisfied:
        an output voltage of the power circuit is equal to or smaller than a first value; and
        an output voltage of the power circuit is equal to or greater than a second value which is greater than the first value.

3. A vehicular electric power steering device, comprising:
an electric motor that applies an assisting force to a steering torque in accordance with rotational motion of a steering handle;
a torque sensor that detects the steering torque;
a motor controller that controls rotation of the electric motor in accordance with the detected steering torque;
an abnormality detector that detects an abnormality in the torque sensor;
a supplier that supplies a voltage to the torque sensor to activate the torque sensor; and
an abnormality detection forbidder that forbids detection of an abnormality in the torque sensor by the abnormality detector when the voltage supplied to the torque sensor is equal to or smaller than a predetermined voltage.

4. The vehicular electric power steering device according to claim 3, wherein:
the torque sensor outputs a first detection signal indicative of a steering torque and a second detection signal indicative of a steering torque; and
the abnormality detector detects an abnormality in the torque sensor if one of the following conditions is satisfied:
a voltage signal outputted from the torque sensor is equal to or smaller than a first value;
a voltage signal outputted from the torque sensor is equal to or greater than a second value which is greater than the first value; and
an absolute value of a difference between the first and second detection signals is equal to or greater than a predetermined value.

5. The vehicular electric power steering device according to claim 3, wherein: the supplier includes a battery that supplies the voltage to the torque sensor.

6. The vehicular electric power steering device according to claim 3, wherein: the supplier includes:
a power circuit that supplies a constant voltage to the torque sensor; and
a battery that supplies a voltage to the power circuit.

7. A vehicular electric power steering device, comprising:
an electric motor that applies an assisting force to rotational motion of a steering handle;
a torque sensor that detects a steering torque and which outputs a detection signal indicative of the steering torque;
a motor controller that controls rotation of the electric motor in accordance with the steering torque indicated by the detection signal;
an abnormality judger that detects an abnormality in the detection signal from the torque sensor and that judges that the torque sensor is abnormal, if detection of the abnormality in the detection signal continues for a predetermined period or more; and
a steering torque holder that holds a steering torque represented by the detection signal during normal operation of the torque sensor at least until judgment of an abnormality made by the abnormality judger, if an abnormality in the detection signal from the torque sensor has been detected, and that controls the motor controller so as to control rotation of the electric motor in accordance with the held steering torque instead of the steering torque represented by the detection signal.

8. The vehicular power steering device according to claim 7, wherein:
the abnormality in the detection signal is detected, if one of the following conditions is satisfied:
the detection signal is equal to or smaller than a first value; and
the detection signal is equal to or greater than a second value which is greater than the first value.

9. A vehicular electric power steering device, comprising:
an electric motor that applies an assisting force to a steering torque in accordance with rotational motion of a steering handle;
a torque sensor that detects the steering torque;
a motor controller that controls rotation of the electric motor in accordance with the detected steering torque;
a power circuit that is supplied with a voltage from a battery and that supplies a constant voltage to the torque sensor to activate the torque sensor;
an abnormality judger that detects an abnormality in a voltage supplied from the power circuit to the torque sensor and that judges that the power circuit is abnormal, if detection of the abnormality in the voltage continues for a predetermined period or more; and
a steering torque holder that holds a steering angle and a torque detected by the torque sensor during normal operation of the power circuit at least until judgment of an abnormality made by the abnormality judger, if an abnormality in a voltage supplied from the power circuit to the torque sensor has been detected, and that controls rotation of the electric motor in accordance with the held steering torque instead of the detected steering torque.

10. The vehicular power steering device according to claim 9, wherein:
the abnormality in the voltage supplied to the torque sensor is detected, if one of the following conditions is satisfied:
the voltage is equal to or smaller than a first value; and
the voltage is equal to or greater than a second value which is greater than the first value.

11. A method for controlling a vehicular electric power steering device including an electric motor, a battery, a torque sensor, and a power circuit, the method comprising:
applying an assisting force from the electric motor to a steering torque in accordance with rotational motion of a steering handle;
detecting the steering torque with the torque sensor;
controlling rotation of the electric motor in accordance with the detected steering torque;
supplying the voltage from the battery to the power circuit, and supplying a constant voltage to the torque sensor to activate the torque sensor;
detecting an abnormality in the power circuit; and
forbidding detection of an abnormality in the power circuit when the voltage supplied to the power circuit is equal to or smaller than a predetermined voltage.

12. The method according to claim 11, wherein:
an abnormality in the power circuit is detected, if one of the following conditions is satisfied:
an output voltage of the power circuit is equal to or smaller than a first value; and
an output voltage of the power circuit is equal to or greater than a second value which is greater than the first value.

13. A method for controlling a vehicular electric power steering device including an electric motor and a torque sensor, the method comprising:

applying an assisting force from the electric motor to a steering torque in accordance with rotational motion of a steering handle;

detecting the steering torque with the torque sensor;

controlling rotation of the electric motor in accordance with the detected steering torque;

detecting an abnormality in the torque sensor;

supplying a voltage to the torque sensor to activate the torque sensor; and forbidding detection of an abnormality in the torque sensor when the voltage supplied to the torque sensor is equal to or smaller than a predetermined voltage.

14. The method according to claim 13, wherein:

the torque sensor outputs a first detection signal indicative of a steering torque and a second detection signal indicative of a steering torque; and an abnormality in the torque sensor is detected, if one of the following conditions is satisfied:
 a voltage signal outputted from the torque sensor is equal to or smaller than a first value;
 a voltage signal outputted from the torque sensor is equal to or greater than a second value which is greater than the first value; and
 an absolute value of a difference between the first and second detection signals is equal to or greater than a predetermined value.

15. The method according to claim 13, wherein:

a battery supplies the voltage to the torque sensor.

16. The method according to claim 13, wherein:

a power circuit supplies a constant voltage to the torque sensor; and a battery supplies a voltage to the power circuit.

17. The method for controlling a vehicular electric power steering device including an electric motor and a torque sensor, the method comprising:

applying an assisting force from the electric motor to rotational motion of a steering handle;

detecting a steering torque with the torque sensor outputting a detection signal indicative of the steering torque;

controlling rotation of the electric motor in accordance with the steering torque indicated by the detection signal;

detecting an abnormality in the detection signal from the torque sensor and judging that the torque sensor is abnormal, if detection of the abnormality in the detection signal continues for a predetermined period or more; and holding a steering torque represented by the detection signal during normal operation of the torque sensor at least until judgment of an abnormality is made, if an abnormality in the detection signal from the torque sensor has been detected, and controlling the motor controller so as to control rotation of the electric motor in accordance with the held steering torque instead of the steering torque represented by the detection signal.

18. The method according to claim 17, wherein:

the abnormality in the detection signal is detected, if one of the following conditions is satisfied:
 the detection signal is equal to or smaller than a first value; and
 the detection signal is equal to or greater than a second value which is greater than the first value.

19. A method for controlling a vehicular electric power steering device including an electric motor, a torque sensor, a battery, and a power circuit, the method comprising:

applying an assisting force with the electric motor to a steering torque in accordance with rotational motion of a steering handle;

detecting the steering torque with the torque sensor;

controlling rotation of the electric motor in accordance with the detected steering torque;

supplying a voltage to the power circuit from the battery and supplying a constant voltage to the torque sensor to activate the torque sensor;

detecting an abnormality in a voltage supplied from the power circuit to the torque sensor and judging that the power circuit is abnormal, if detection of the abnormality in the voltage continues for a predetermined period or more; and holding a steering angle and a torque detected by the torque sensor during normal operation of the power circuit at least until judgment of an abnormality is made, if an abnormality in a voltage supplied from the power circuit to the torque sensor has been detected, and controlling rotation of the electric motor in accordance with the held steering torque instead of the detected steering torque.

20. The method according to claim 19, wherein:

the abnormality in the voltage supplied to the torque sensor is detected, if one of the following conditions is satisfied:
 the voltage is equal to or smaller than a first value; and
 the voltage is equal to or greater than a second value which is greater than the first value.

* * * * *